United States Patent [19]

Waitkus et al.

[11] Patent Number: 4,656,239

[45] Date of Patent: Apr. 7, 1987

[54] PROCESS FOR THE PREPARATION OF PHENOL FORMALDEHYDE RESOLE RESINS

[75] Inventors: Phillip A. Waitkus; Bohumir Lepeska, both of Sheboygan, Wis.

[73] Assignee: Plastics Engineering Company, Sheboygan, Wis.

[21] Appl. No.: 844,544

[22] Filed: Mar. 27, 1986

[51] Int. Cl.$^4$ .......................... C08G 8/08; C08G 8/10
[52] U.S. Cl. ...................... 528/140; 528/137; 528/145; 528/146; 528/147; 528/153; 528/155; 528/165
[58] Field of Search ............... 528/137, 140, 145, 146, 528/147, 165, 153, 155

[56] References Cited

U.S. PATENT DOCUMENTS

| | | | |
|---|---|---|---|
| 2,934,511 | 4/1960 | Auerbach et al. | 528/165 X |
| 3,425,989 | 2/1969 | Shepard et al. | 528/155 X |
| 3,657,188 | 4/1972 | Perkins, Jr. | 528/165 X |
| 3,677,986 | 7/1972 | Buchanan | 528/165 X |
| 4,028,367 | 6/1977 | Higginbottom | 528/165 X |
| 4,119,611 | 10/1978 | Löbering | 528/140 X |
| 4,130,550 | 12/1978 | Kitsuda et al. | 528/140 X |
| 4,140,845 | 2/1979 | Vasishth | 528/140 X |
| 4,176,106 | 11/1979 | Reid et al. | 528/140 X |
| 4,239,869 | 12/1980 | Annis | 528/140 X |
| 4,413,113 | 11/1983 | Gelling et al. | 528/165 |
| 4,578,448 | 3/1986 | Brode et al. | 528/140 X |

*Primary Examiner*—Howard E. Schain
*Attorney, Agent, or Firm*—Walter J. Monacelli

[57] ABSTRACT

The process described herein involves the gradual addition of aqueous formaldehyde, containing 35–60 percent by weight of formaldehyde, to a phenol maintained at a temperature of 60°–100° C., preferably 70°–90° C., and at a reduced pressure of 11–26 inches of mercury in the presence of an alkaline catalyst. The rate of formaldehyde addition is such that the exothermic reaction aids in maintaining the stated temperature range and thereby simultaneously distills approximately all the water added with the formaldehyde and that formed by the condensation so that the volume of the reaction mass is maintained approximately constant. This constant volume allows efficient use of the equipment.

26 Claims, No Drawings

PROCESS FOR THE PREPARATION OF PHENOL FORMALDEHYDE RESOLE RESINS

FIELD OF THE INVENTION

This invention relates to a process for the production of phenolic-formaldehyde resole resins. More specifically it relates to a process for the production of resole resins by a batch operation in which the reaction batch is maintained at approximately constant volume even though the aqueous formaldehyde (formalin) component is added gradually during the course of the reaction. Still more specifically it relates to a process in which a specific temperature range and reduced pressure range are maintained to remove water from the system at approximately the rate at which it is being added so as to maintain approximately a constant volume while producing the resole resin of desired properties.

STATE OF PRIOR ART

In producing resols by the reaction of phenol with aqueous formaldehyde solutions (formalin), larger equipment is required in order to accommodate the volume of water present in the aqueous solution, with the volume being larger with the more dilute solutions. Such volume requirements reduce the productivity of a certain size reactor. When paraformaldehyde (para) is used to avoid the volume of water in the reaction mass, the reproducibility and uniformity of the product are unfavorably affected and the cost is increased since the para is much more expensive than the formaldehyde available in commercial formalin.

There are numerous patents which describe the preparation of resole resins from phenol and formalin (aqueous solution of formaldehyde). However each of the processes described have various disadvantages. In most cases the formalin is added all at once as an original mixture with phenol, such as U.S. Pat. Nos. 4,119,611; 4,130,550; 4,176,106 and 4,268,657. Such batch addition is not considered favorable to producing desirable resole products, since much larger volume of the reactor is required for the amount of water added with the formaldehyde. This means that either larger equipment is required or lower productivity results for a particular size of equipment which results in either case in an increased cost of production. In some cases where there may be gradual addition of formalin, water is not removed simultaneously during the gradual addition, such as U.S. Pat. No. 2,934,511 (Example 12) wherein formalin is added gradually to a prereacted mixture of phenol, t-Bu-phenol and hexamethylenetetramine. In U.S. Pat. No. 3,425,989 formalin is added gradually to phenol at a temperature of 130°–160° C. with proportions of 0.1 to 1 mole of formaldehyde per mole of phenol such as will produce Novolacs. Such temperatures automatically distill the water. However such high temperatures are unfavorable with the higher proportions of formaldehyde used for the production of resoles since they may cause premature gelation or excessive thickening.

U.S. Pat. No. 3,657,188 describes a continuous process of producing resoles in which an initial mixture contains the phenol and all the formalin with this mixture being fed to a first heat exchanger to maintain a temperature of 194° F. (90° C. and then through a second heat exchanger to lower the temperature to about 70° F. (21° C.) before being pumped into a film evaporator for water removal. There is no continuous removal of water during the reaction.

In U.S. Pat. No. 4,239,869 (Example 2), a Novolac is prepared by feeding formalin into phenol maintained at 105°–110° C. and containing an acid catalyst. The rate of formaldehyde introduction is sufficient by exothermic reaction to maintain the temperature at 105°–110° C. A phase separator removes water distillate at atmospheric pressure and the proportion of $CH_2O$ to phenol is about 0.69/1 to give a Novolac. In U.S. Pat. No. 4,239,869 (Example 6) a Novolac is prepared from a mixture of phenol and Bisphenol A by adding a solution of formalin and sulfuric acid at a rate sufficient to maintain reflux and water separation at atmospheric pressure. As pointed out above, these temperatures are suitable for the production of Novolacs but not for resoles.

None of these patents show a batch operation for the production of a phenolformaldehyde resole in which formalin is added gradually to a phenol containing an alkaline catalyst with a temperature of 60°–90° C., preferably 70°–80° C., being maintained under a vacuum of 20–26 inches of mercury so that the amount of distilled water is approximately equivalent to that being added in the formalin plus that being formed by the condensation so that the reaction batch volume is approximately constant throughout the reaction.

It is an object of this invention to produce resole resins of phenol and formaldehyde under conditions which will avoid premature gelation and excessive thickening.

It is also an object of this invention to produce both liquid and solid resole resins of desirable properties by batch operation under conditions in which the volume of the reaction batch will be maintained approximately constant so as to give maximum and efficient utilization of equipment.

It is another object of this invention to utilize the exothermic energy of the condensation reaction to remove water from the reaction mass at a rate adequate to maintain a constant batch volume.

SUMMARY OF INVENTION

In accordance with the present invention it has been found that both liquid and solid phenol-formaldehyde resole resins of desirable properties can be made by a batch process in which the reaction mass is maintained at a temperature of 60°–100° C., preferably 70°–80° C., and a reduced pressure of 11–26 inches of Hg with the formaldehyde introduced as an aqueous solution of 35–60 percent formaldehyde, preferably about 45–55 percent by weight, into a phenol containing an alkaline catalyst, the rate of addition of formaldehyde solution being appropriate to maintain the distillation of approximately all the water added with the formaldehyde and formed in the condensation so that the volume of the reaction mass is maintained approximately constant. This constant volume allows efficient use of the equipment with 60–80 percent of the reactor being occupied by the reaction mass preferably 60–90 percent.

During the addition of the aqueous formaldehyde solution, manual or mechanical vacuum control may be used to maintain the reaction temperature. As formaldehyde is added the operator usually adjusts the vacuum slowly to maintain the desired holding temperature. When all the formaldehyde has been added, the reaction mixture is vacuum distilled to remove any accumulation of added water and water of reaction. The resin is then discharged. Because the addition is concurrent with distillation, the liquid level increases only slightly during the reaction (about 20%); and, because the kettle may be charged with far more phenol than is possible with conventional batch processing, yields of almost twice the normal kettle yield are obtained.

Substantially all the water present in the formaldehyde is removed during the addition. At certain high addition rates and low temperatures, it is possible that a slow accumulation of water may occur during the reaction as a result of a higher addition rate than distillation rate. However, the process is most economical when the distillation rate is nearly equal to or greater than the addition rate. If it is less than the addition rate, valuable kettle volume is lost to hold water, and not resin, causing a reduction in productivity. Of course, the distillation rate can only be greater than the addition rate for short periods as over the long run the two must be equal.

The process can be operated with or without a solvent. If a solvent is employed, it should be one which is non-miscible with water and should form an azeotrope with water. This last criterion is not absolutely necessary. Also, as an extraction media it should have a distribution coefficient which favors extraction of phenol from the aqueous phase to the organic phase. The distribution coefficient $K_D$, in dilute solution between two equal volumes of immiscible solvent is simply:

$$K_{D'} = C_A / C_B^B$$

Therefore if solvent A is the extractant the following applies:

$$C_A > C_B^B, \text{ or } K_{D'} \text{ is greater than } 1.0$$

$C_A$ and $C_B^B$ are the concentration in the organic and aqueous phase, respectively. If the distribution coefficient is below one, and the material does not form an azeotrope, there is little to be gained by using that solvent as neither efficient water removal nor efficient extraction and return to the kettle will be achieved. Toluene and xylene are very suitable.

Formalin or aqueous formaldehyde solution containing 35–60 percent by weight is used. The more dilute the formaldehyde the more heat will be required to distill off the water. Solutions of 45–55 percent formaldehyde are preferred.

A basic or alkaline catalyst is used, such as potassium, sodium or barium hydroxide, lime or a strong amine catalyst, such as tetramethylammonium hydroxide or aniline. Other strong amine catalysts include toluidine, naphthylamine, ar-ethyl aniline and various tetralkylammonium hydroxides, such as tetraethylammonium hydroxide, tetrapropylammonium hydroxide, tetrabutylammonium hydroxide, tetrabenzylammonium hydroxide, tetraphenethylammonium hydroxide, etc. The amount of alkaline catalyst should be in the range of 0.1 to 1 mole of alkaline catalyst per mole of phenol.

Temperatures of 60°–90° C. are advantageous, preferably 70°–80° C. However with large amounts of alkaline catalyst preferably 1 mole per mole of phenol the temperature may be taken up to 100° C. without the gelation or excessive thickening which occurs with higher temperatures or with low amounts of catalyst.

Any azeotroping agent, such as xylene, toluene, etc., may be used. Preferably 5–10 percent by volume is effective. Larger amounts may be used but are undesirable because of the increased volume occupied.

In a typical production, the reactor is charged with a phenol and a basic catalyst, such as lime, potassium hydroxide, sodium hydroxide, barium hydroxide, or a strong amine catalyst, such as tetramethylammonium hydroxide or aniline. The vessel is charged to 60 to 80% of capacity with these ingredients and the contents heated to 60° to 100° C., preferably 70° to 80° C., and vacuum is applied to about 11–26 inches of Hg. At this point, formaldehyde is slowly added through a dip tube or sparge tube which reaches nearly to the bottom of the vessel. The formaldehyde addition time can be anywhere from one-half to five hours, normally one to two hours is preferred. As the formaldehyde is added, most of it reacts supplying exothermic energy to the batch which causes the water, added with the formaldehyde, to be distilled efficiently from the kettle together with a small amount of phenol. It has been found that at batch temperatures below 60° C., the reaction is incomplete and sluggish, and water removal is inefficient. At temperatures above 90° C. excessive phenol removal is encountered except in the presence of large amounts of alkaline catalyst. Although there is almost enough exothermic energy provided by the formaldehyde for distillation, some heat may be applied to make up any deficiency.

Because of the high productivity, significant savings in utilities and manpower usage are achieved. In addition, the process is very reproducible which allows tighter quality control parameters to be applied than normal so that the product will be uniform. The process can be applied to the production of both solid and liquid single-stage resins, so they will be useful for a wide range of purposes or ultimate products.

The phenolic component of the resole resins of this invention is preferably phenol but may also comprise various other phenolic compounds such as various alkyl-, aryl-, cycloalkyl- and chloro- substituted phenols and naphthols, such as methyl, ethyl, propyl, butyl, phenyl, cyclohexyl, tolyl and chloro-substituted phenols and naphthols. Typical compounds include but are not limited to the following: o, m and p-cresols, ethyl phenols, isopropyl phenol, xylenol, t-butyl phenols, hexyl phenol, octyl phenol, nonyl phenol, phenylphenol, cyclohexyl phenol, bis-phenol-A, benzyl phenol, chloro-phenol, etc. In addition to phenol, other preferred compounds are o, m and p-cresols, bis-phenol-A, xylenol, t-butyl phenol and nonyl phenol.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

In the following examples the bubble viscosity is performed by filling a Gardner-Holdt bubble viscosity tube as per ASTM-D-1545-76. The tube and contents are thermostated in a constant temperature bath at 25° C. as per the above specification.

The molecular weight data are obtained on a Waters Liquid Chromatograph using an ASI MxL ultragel and an ASI MxM ultragel column in series. The apparatus is calibrated using polystyrene standards available from Waters Associates.

EXAMPLE I

Preparation of a Liquid Resole Using Toluene as the Azeotroping Agent

A 4-liter stainless steel resin flask is equipped with a mechanical agitator, a thermometer, an inlet or sparge tube running to the bottom of the vessel and a Dean-Stark trap connected reflux condenser. The inlet tube in turn is connected to a variable speed perastaltic pump which draws its supply of formaldehyde solution from a 4 liter erlenmeyer placed on a digital balance. This arrangement allows accurate and rapid control of formaldehyde feed rates by simply monitoring the weight loss of the erlenmeyer. The reflux condenser atop the Dean-Stark trap is, in turn, connected to a controlled source of vacuum, so that the entire kettle can be evacuated to the desired vacuum while the addition of formaldehyde occurs.

Into the kettle is placed 1504 grams (16 moles) of USP phenol, 150 grams (1.63 moles) of toluene, and 31.2 grams (0.2502 moles) of 45% potassium hydroxide and a vacuum of 24.3" of Hg is applied. The mixture is heated to 85° C. and 1955 grams (33.47 moles) of aqueous 51.4% formaldehyde is added by means of the perastaltic pump-addition tube arrangement over a period of 4 hrs. When all of the formaldehyde has been added, the mixture is held at 90° C. for a bubble viscosity of 12 sec. The bubble viscosity is measured as described above. When the above viscosity is reached, the reaction temperature is lowered to 70° C. and held for a bubble viscosity of 25 sec. It is then cooled to 65° C. and held for a bubble viscosity of 60 sec. When this is achieved 12.8 grams (0.25 moles) of 90% formic acid is added and the resin is cooled. The yield is 2625 grams of resin.

The physical properties of this resin are as follows:
Viscosity, Brookfield @ 25° C., cps: 5500
Specific Gravity @ 25° C.: 1.254
Solids Content, 3 hrs @ 135° C., %: 72.16
Number Ave. Molecular Wt.: 462
Weight Ave Molecular Wt.: 1383
Z-Average Molecular Wt.: 3447
Water Content: 17.6
pH: 4.61
Free Formaldehyde in Resin, %: 4.92
Free Phenol in Resin, %: 3.3

EXAMPLE II

Preparation of a Liquid Phenolic Resin Using no Azeotropic Agent

Into a 4 liter resin flask, equipped as in Example I, is placed 2250 grams (23.94 moles) of USP phenol and 47 grams (0.377 moles) of potassium hydroxide (45%). A vacuum of 24.3" of Hg is applied and maintained. This mixture is heated to 78° C. and 3078 grams (53.34 moles) of 52% aqueous formaldehyde is added over a 2½ hour period. A small amount of heat is applied at a constant rate, so that the temperature is maintained such that the distillation rate is nearly that of the addition rate of formaldehyde. At the end of the addition period the temperature is increased to 85° C. and distillation continued until the total distillate weight is approximately 1300 grams The reaction is then maintained at 85° C. until a bubble viscosity of 15 sec is reached. The technique for bubble viscosity measurement is described in Example I. The mixture is cooled to 75° C. and held for a bubble viscosity of 25 sec. The batch then is cooled to 68° C. and is held again until the bubble viscosity reaches 50 sec. Approximately 75 grams of water is added and the batch is distilled at 26" of Hg until an additional 157 grams of water is collected. At this point 18.3 grams (0.36 moles) of 90% formic acid is added. The batch is mixed and discharged to yield 3922 grams of product. This resinous product has the following properties:
Viscosity, Brookfield @ 25° C., cps: 7400
Specific Gravity @ 25° C.: 1.265
Solids Content, 3 hrs @ 135° C.: 74.13
Free Phenol, %: 3.5
Free Formaldehyde, %: 4.41
pH: 5.5
Number Ave. Molecular Weight: 472
Weight Ave. Molecular Weight: 1103
Z-Average Molecular Weight: 2177

EXAMPLE III

Preparation of Solid Resole Resin by Azeotropic Batch Method (ABR)

Into a four-liter stainless steel kettle equipped with an agitator, thermometer, addition port and Dean-Stark trap, 1500 grams (15.96 moles) of USP phenol is charged. Then 207 grams of o-xylene and a solution of 0.75 g of hexamethylenetetramine (hexa) (0.54 moles) in 75 grams of water is added followed by the addition of 14 grams (0.19 moles) of lime in 28 grams of water. The mixture is agitated and heated to 90° C. The gradual addition of 1200 grams (20.8 moles) of 52% formaldehyde is then started by means of a calibrated Masterflex pump and a steel capillary reaching to the bottom of the kettle.

Formaldehyde addition takes 3 hrs and during that time vacuum reflux is applied and maintained to keep the reaction temperature at 90° C. and to remove water continuously as an azeotrope with xylene. The xylene layer (containing some free phenol) is separated from the water layer in the Dean-Stark trap and returned continuously into the kettle. After the formaldehyde addition is completed, the Dean-Stark trap is removed and the kettle is set for vacuum distillation. During this vacuum distillation the batch temperature is kept above 70° C. and when the vacuum reaches 26-28" and the batch temperature reaches 80°-90° C., the resin is discharged into a stainless steel pan and cooled to room temperature (the exact time of discharge completion is determined by the value of the torque on the agitator). The distillate is separated into xylene layer and water layer. The xylene layer (containing phenol) can be re-used in another batch. The resin is brittle, grindable, with melt point (stick point) of 70° C. and gel time at 166° C. of 20-23 seconds. The yield of resin is 2060 grams. Kettle cycle time is 5½ hours.

EXAMPLE IV

Preparation of Solid Resole Resin by Azeotropic Batch Method (ABR)

Into a four-liter stainless steel kettle equipped with an agitator, thermometer, addition port and Dean-Stark trap 1500 grams (15.96 moles) of USP phenol is charged. Then 207 grams of o-xylene and a solution of 50 g of hexa (0.36 moles) in 75 grams of water are added followed by the addition of 7 grams of sodium hydroxide (0.17 moles) in 21 grams of water. The mixture is agitated and heated to 90° C. A vacuum is applied sufficient to maintain the temperature at 90° C. The addition of 1200 grams (20.8 moles) of 52% formaldehyde in water solution is then started and maintained by means of a calibrated Masterflex pump and a steel capillary reaching to the bottom of the kettle.

Formaldehyde addition takes 3 hrs and during that time vacuum reflux is maintained to keep the reaction temperature at 90° C. and to remove water continuously as an azeotrope with xylene. The xylene layer (containing some free phenol) is separated in the Dean-Stark trap from the water layer and returned continuously into the kettle. After the formaldehyde addition is completed, the Dean-Stark trap is removed and the kettle is set for vacuum dehydration. During this vacuum distillation the batch temperature is kept above 70° C., and when the vacuum reaches 26–28" and the batch temperature reaches 80°–90° C., the resin is discharged into a stainless steel pan and cooled to room temperature (the exact time of discharge completion is determined by the value of the torque on the agitator). The distillate is separated into xylene layer and water layer, and the xylene layer (containing phenol) can be reused in the next batch. The resin is brittle, grindable, with melt point (stick point) of 72° C. and gel time at 20–22 sec. The yield of resin is 1965 grams. Kettle cycle time is 5½ hours.

EXAMPLE V

Preparation of Solid Resole Resin by Azeotropic Batch Method (ABR)

Into a four-liter stainless steel kettle equipped with an agitator, thermometer, addition port and Dean-Stark trap 1500 grams (15.96 moles) of USP phenol is charged. Then 207 grams of o-xylene, 75 grams (0.81 moles) of aniline, and 15 grams (0.20 moles) of lime in 30 grams of water, are added. The mixture is agitated and heated to 80° C. The addition of 1400 grams (24.27 moles) of 52% aqueous formaldehyde is then started and maintained by means of a calibrated Masterflex pump and a steel capillary reaching to the bottom of the kettle.

Formaldehyde addition takes 2 hrs and during that time vacuum reflux is maintained to keep the reaction temperature at 80° C. and to remove water continuously as an azeotrope with xylene. The xylene layer (containing some free phenol) is separated in the Dean-Stark trap from the water layer and returned continuously into the kettle. After the formaldehyde addition is completed, the Dean-Stark trap is removed and the kettle is set for vacuum dehydration. During this vacuum distillation the batch temperature is kept above 70° C. and when the vacuum reaches 26" and the batch temperature reaches 88° C., the vacuum is stopped and 45 grams (0.32 moles) of hexa in 240 grams of water and 21 grams of glyceryl monooleate are added. Vacuum distillation is resumed and the batch is distilled to 26" of Hg and 90° C. When the desired resin viscosity is reached (as indicated by the value of the torque on the agitator), the resin is discharged into a stainless steel pan and cooled to room temperature. The distillate layers are separated and the xylene layer (containing phenol) can be reused in the next batch. The resin is brittle, grindable, with melt point (stick point) of 79° C. and gel time at 166° C. of 18–19 seconds. The yield of resin is 2125 g. Kettle cycle time is 6 hours.

EXAMPLE VI

Preparation of a high caustic-containing resole resin by the azeotropic batch method Into a 4 liter resin flask, as equippped in Example I, is placed 1800 grams of USP phenol. 1120 grams of 50% caustic soda solution is slowly added to the stirred phenol. This mixture is heated to a temperature 102°–105° C. and 2904 grams of 50.89% formaldehyde is added slowly over a 2½ hr period. No vacuum is used as the water is slowly distilled at this temperature. When 2904 grams of formaldehyde has been added, the reaction mixture gels and is observed to wrap around the agitator. The batch is discontinued.

EXAMPLE VII

Reaction temperature 100° C. using vacuum to control temperature

Into a 4 liter resin flask, equipped as in Example I, is placed 1800 grams of USP phenol. 1120 grams of 50% caustic soda solution is slowly added to the stirred phenol. This mixture is heated to a temperature of 100° C. and 2904 grams of 50.89% formaldehyde is slowly added over a 4½ hr period using sufficient vacuum to maintain the temperature at 100° C. At the first part of the reaction the vacuum is 19.5". This is slowly reduced to 11" as the reaction progresses. The heat input as supplied by an electric mantel is slowly increased from a setting of 70 to 90 in order to maintain the temperature. At the end of this period all the formaldehyde has been added and the resin is diluted with 1735 g of water in a separate vessel to yield 4575 g of resin with a viscosity of 95 cps and a specific gravity of 1.186. The two-hours solids content, measured by baking a sample of the resin in an aluminum dish for 2 hours at 105° C., is 44.02. The resin is found to be infinitely dilutable with water. The 1537 g of aqueous distillate, which is removed during the formaldehyde addition process, is found to contain 0.24% free formaldehyde.

EXAMPLE VIII

Repeat of Example VII Using Reaction Temperature of 95° C.

An additional batch of the resin, as described in Example VII, is prepared exactly as it was in Example VII except that the reaction temperature is maintained at 95° C. At the end of the addition period the vacuum is released and the reaction mixture is held for an additional hour at 95° C. prior to diluting it. The product is found to have a solids content, measured as before, of 44.08%, a viscosity of 2,000 cps, and a specific gravity of 1.190. Water dilution is again found to be infinite and the 1492 g of distillate collected is found to contain 0.21% free formaldehyde.

While it is preferred to operate at a temperature of 60°–90° C. with a reduced pressure of 20–26 inches of mercury, it is also shown in Examples VII and VIII that temperatures as high as 100° C. may be used provided that as much as a mole of alkaline catalyst is used per mole of phenol to prevent gelation. With such higher temperatures it is is possible to use reduced pressures as low as 11 inches of mercury in order to have simultaneous water distillation or removal. In other words the reduced pressure is that which will give a suitable rate of distillation at the temperature being used. Therefore the broad range of reduced pressure 11-29 inches of mercury depending on the temperature being used.

EXAMPLE IX

The procedure of Example I is repeated a number of times with similar successful results using in place of the phenol equivalent amounts respectively of the following compounds:
(a) o-Cresol
(b) m-Cresol
(c) p-Cresol
(d) Mixed Cresols
(e) bis-Phenol-A
(f) Xylenol
(g) t-Butyl phenol
(h) Nonyl phenol While certain features of this invention have been described in detail with respect to various embodiments thereof, it will of course be apparent that other modifications can be made within the spirit and scope of this invention and it is not intended to limit the invention to the exact details shown above except insofar as they are defined in the following claims.

The invention claimed is:

1. The process of producing a phenolic-formaldehyde resol resin in which the volume of the reaction mass is maintained at 60-80 percent of the volume of the reaction vessel comprising the steps of:
    (a) filling a reaction vessel to 60-80 percent of the volume of said vessel with a phenolic compound;
    (b) maintaining said phenolic compound at a temperature of 60°-100° C. and a reduced pressure of 11-26 inches of mercury;
    (c) feeding into said heated phenolic compound an aqueous solution containing 35-60 percent by weight of formaldehyde and reacting said formaldehyde with said phenolic compound in the presence of an alkaline catalyst, the rate of feeding said formaldehyde solution being such that the amount of water being thus added is substantially equal to the amount of water being removed therefrom by distillation and thereby keep the volume of the reaction mass at 60-90 percent of the volume of the reaction vessel.

2. The process of claim 1 in which said phenolic compound is selected from the group consisting of o-cresol, m-cresol, p-cresol, a mixture of cresols, bis-phenol-A, xylenol, t-butyl phenol and nonyl phenol.

3. The process of claim 1 in which said phenolic compound is phenol.

4. The process of claim 3 in which said reaction mass volume occupies 70-80 percent of the volume of said vessel.

5. The process of claim 4 in which said reaction temperature is maintained at 70°-90° C.

6. The process of claim 5 in which said formaldehyde solution contains approximately 45-55 percent by weight of formaldeyde.

7. The process of claim 6 in which said alkaline catalyst is selected from the group consisting of potassium hydroxide, sodium hydroxide, barium hydroxide, lime, tetramethylammonium hydroxide and aniline.

8. The process of claim 7 in which said catalyst is present in a proportion of 0.1-1 mole per mole of said phenol.

9. The process of claim 7 in which said catalyst is sodium hydroxide.

10. The process of claim 7 in which said catalyst is barium hydroxide.

11. The process of claim 7 in which said catalyst is potassium hydroxide.

12. The process of claim 7 in which said catalyst is lime.

13. The process of claim 7 in which said catalyst is aniline.

14. The process of claim 7 in which said catalyst is tetramethylammonium hydroxide.

15. The process of claim 7 in which said reaction mass contains an azeotrope forming agent.

16. The process of claim 15 in which said azeotrope forming agent is toluene.

17. The process of claim 15 in which said azeotrope forming agent is xylene.

18. The process of claim 1 in which said formaldehyde solution contains approximately 45-55 percent by weight of formaldehyde.

19. The process of claim 18 in which said catalyst is selected from the group consisting of potassium, hydroxide, sodium hydroxide, barium hydroxide, lime, tetramethylammonium hydroxide and aniline.

20. The process of claim 19 in which said catalyst is present in a proportion of 0.1-1 mole per mole of said phenol.

21. The process of claim 20 in which said reaction mass contains an azeotrope forming agent.

22. The process of claim 21 in which said azeotrope forming agent is toluene.

23. The process of claim 21 in which said azeotrope forming agent is xylene.

24. The process of claim 1 in which the temperature is 70°-90° C. and the reduced pressure is 20-26 inches of mercury.

25. The process of claim 1 in which the formaldehyde solution contains approximately 45-55 percent by weight of formaldehyde.

26. The process of claim 25 in which said alkaline catalyst is selected from the group consisting of potassium hydroxide, sodium hydroxide, barium hydroxide, lime, tetramethylammonium hydroxide and aniline.

* * * * *